United States Patent
Bertram et al.

[11] Patent Number: 5,923,861
[45] Date of Patent: Jul. 13, 1999

[54] MOBILE CLIENT COMPUTER PROGRAMMED TO DISPLAY DROP DOWN SCROLLING INDICATOR

[75] Inventors: Randal Lee Bertram, Raleigh; David Frederick Champion, Durham, both of N.C.

[73] Assignee: International Business Machines Corporation, Armonk, N.Y.

[21] Appl. No.: 08/813,527

[22] Filed: Mar. 7, 1997

[51] Int. Cl.[6] ..................................................... G06F 3/14
[52] U.S. Cl. ............................................ 395/341; 345/340
[58] Field of Search ...................................... 345/341, 340, 345/326, 339, 342, 353, 145, 150

[56] References Cited

U.S. PATENT DOCUMENTS

| | | | |
|---|---|---|---|
| 5,402,152 | 3/1995 | Needham | 345/179 |
| 5,493,641 | 2/1996 | Brown | 345/341 |
| 5,510,808 | 4/1996 | Cina, Jr. et al. | 345/123 |
| 5,655,094 | 8/1997 | Cline et al. | 345/341 |
| 5,659,333 | 8/1997 | Okishima | 345/123 |
| 5,726,687 | 3/1998 | Belfiore et al. | 345/341 |

*Primary Examiner*—Steven P. Sax
*Attorney, Agent, or Firm*—Bernard D. Bogdon; Daniel E. McConnell

[57] ABSTRACT

A display generating system, such as a mobile client computer system, in which a scroll bar is selectively deployed from a less active or "stored" position to a fully active or "extended" position. Deployment of the scroll bar may be by an animated process resembling an unrolling. By deploying the scroll bar only as required and requested by a user, the scroll bar may be enlarged for use and additional functions supported.

52 Claims, 9 Drawing Sheets

MOBILE CLIENT COMPUTER PROGRAMMED TO DISPLAY DROP DOWN SCROLLING INDICATOR

RELATED APPLICATIONS

This application is one of a series of related applications assigned to common ownership. Other applications in the series include:

Application Ser. No. 08/781,004 filed Jan. 9, 1997, entitled "Mobile Client Computer with Keyboard Interface" with named inventors T. Aebli, B. Miller and W. W. Vetter;

Application Ser. No. 08/703,171 filed Aug. 22, 1996, entitled "Mobile Client Computer Programmed to Predict Input" with named inventors R. L. Bertram, D. F. Champion and P. Brittenham;

Application Ser. No. 08/708,168 filed Aug. 22, 1996, entitled "Mobile Client Computer Programmed to Exchange Lists of Predicted Input" with named inventors R. L. Bertram and W. T. Oldfield;

Application Serial No. * filed *, entitled "Mobile Client Computer Interacting with Docking Device" with named inventors E. H. Booth, B. A. Carpenter, R. B. Ferrier, R. A. Resnick and W. W. Vetter and filed under Attorney's Docket No. RP9-95-019;

Application Ser. No. 08/706,990 filed Aug. 22, 1996, entitled "Mobile Client Computer Programmed to Copy Lists of Predicted Input" with named inventors R. L. Bertram, P. J. Brittenham and D. F. Champion;

Application Serial No. * filed *, entitled "Mobile Client Computer with Battery Charging Control" with named inventors C. Burroughs, B. A. Carpenter, G. O'Neil and R. A. Resnick and filed under Attorney's Docket No. RP9-95-024;

Application Serial No. * filed *, entitled Mobile Client Computer Programmed for Systems Message Display" with named inventors R. L. Bertram and D. F. Champion and filed under Attorney's Docket No. RP9-95-025;

Application Serial No. * filed *, entitled "Mobile Client Computer Programmed with Browser Function" with named inventors R. L. Bertram and D. F. Champion and filed under Attorney's Docket No. RP9-95-026;

Application Serial No. * filed *, entitled "Mobile Client Computer Programmed to Process Table Displays" with named inventor R. L. Bertram and filed under Attorney's Docket No. RP9-95-027;

Application Serial No. * filed *, entitled "Mobile Client Computer Programmed to Combine Cursor, Control and Input Functions" with named inventors P. J. Brittenham and L. D. Comerford and filed under Attorney's Docket No. RP9-95-028;

Application Serial No. * filed *, entitled "Mobile Client Computer Programmed to Hide Empty Table Elements" with named inventor R. L. Bertram and filed under Attorney's Docket No. RP9-95-039;

Application Serial No. * filed *, entitled "Mobile Client Computer with Integrated Cellular Telephone" with named inventors B. A. Carpenter, P. Lee, M. Noll and R. Reiland and filed under Attorney's Docket No. RP9-95-047;

Application Serial No. * filed *, entitled "Mobile Client Computer with Holster for Integrating a Radio Transceiver" with named inventors D. H. Boehm, B. A. Carpenter, D. J. Hunt and M. S. Miller and filed under Attorney's Docket No. RP9-95-050;

Application Ser. No. 08/700,608 filed Aug. 12, 1996, entitled "Mobile Client Computer Programmed to Display Hexagonal Keyboard" with named inventors R. L. Bertram, D. F. Champion and L. S. Eichorn;

Application Ser. No. 08/700,606 filed Aug. 12, 1996, entitled "Mobile Client Computer Programmed to Establish Soft Keyboard Targeting" with named inventor R. L. Bertram; and Application Ser. No. 08/706,991 filed Aug. 22, 1996, entitled "Mobile Client Computer Programmed to Display Lists and Hexagonal Keyboard" with named inventors R. L. Bertram and D. F. Champion.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are the personal computer systems offered by IBM and identified as the PERSONAL COMPUTER AT, PERSONAL SYSTEM/2, PS/1, Aptiva, and the like. Persons of skill in the computer arts will be familiar with these systems.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models originally used the popular INTEL 8088 or 8086 microprocessor as the system processor. These processors have the ability to address one megabyte of memory. The Family II models typically used the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. As the state of the art has progressed, Family I systems have developed toward ever higher capability central processor units, including the Intel PENTIUM brand microprocessor and its competitors, Reduced Instruction Set Computing (RISC) microprocessors such as the IBM and Motorola Power PC processors, and higher capability bus designs such as VESA and PCI bus designs. Again, persons of skill in the computer arts will be familiar with these systems.

The impact of such development on the manner in which computing is done in business and consumer environments has been profound. Prior to the development of personal computer systems, most use of computers was for business purposes only and data processing was done in the "glass house" which housed the computer system. Inquiries were channeled through information managers for handling by computer technicians. With the wide spread use of personal computer systems access to data once maintained on an enterprise wide computer system became important to managers and ultimately line employees. Networks of personal computer systems grew up, with layered access through network servers to the enterprise systems or mainframes on which enterprise data is stored.

As information work has spread to an increasing number of information workers and impacted the work of more wide spread groups of employees within an enterprise, need for mobility of such employees has arisen. Particularly in such "outside" jobs as route salesperson, transport driver, or business consultant, it has become important to have access, while remote from an enterprise site, to enterprise data normally maintained on an enterprise system and accessed through a network of computer systems. Such access has been achieved, in part, through the use of wireline connected personal computer systems such as notebook or laptop computer systems. Typically, such a system may be equipped with a modem and communications software such that, when connected to a public switched telephone network (PSTN), the system may be connected with a supporting server or mainframe and a user may gain access to desired data.

With the development of radio communications such as exemplified by the cellular telephone networks, the possibility arose of eliminating the wireline connection between a personal computer system and a supporting server. Such systems have been developed, particularly for systems used in retail and warehousing businesses, which permit a user to move freely within an area which has radio transceiver service while remaining in intermittent or continuous contact with a data channel through which data may be exchanged with a server or mainframe supporting an enterprise activity. For purposes of discussion here, such systems in the hands of user will be referred to as "mobile client systems". A mobile client system is distinguished by the mobility of the user, who is free of the restraints against movement imposed by a wireline connection, and by the client nature of the system in that enterprise data accessed by the mobile client system is maintained on a server or mainframe computer system with which the mobile client is in communication. Such mobile client systems are also sometimes referred to as personal communications assistants or personal digital assistants. The interested reader is referred to "Wireless: The Revolution in Personal Telecommunications" by Ira Brodsky (Artech House, Boston, 1995) for additional background and information about mobile client systems.

Persons familiar with the use of systems as described above will also be familiar with the use of scroll bars for display or document navigation in graphic user interfaces. Scroll bars are commonplace in such interfaces and applications which use such interfaces. A vertical scroll bar consists of a narrow strip to one side (usually the right side) of a window with an up arrow at the top, and down arrow at the bottom, and a slider or "elevator" in between which moves to indicate the position in a long document of the displayed "window". A user can navigate to another portion of a document by moving up or down slowly using the endpoint arrows, moving up or down a screen at a time by selecting (typically by cursor movement and "click") the space above or below the slider or elevator, or moving directly to another location in the document by dragging the elevator or slider with a pointing device. A horizontal scroll bar functions similarly, and usually appears across the bottom of a windowed display.

Scroll bars implemented as described above suffer from difficulties in use. First, the scroll bar occupies permanent space in the displayed window. Where a display area is large, as on a conventional desktop display, this may be a minor irritant. Loss of display area becomes significantly more important as display area shrinks. Next, if the scroll bar is to be activated by anything other than a conventional pointing device, such as would be the case in a system using a touchscreen display, the scroll bar must be enlarged.

Scroll bars are also less than intuitive for unskilled computer users. While persons accustomed to using computers will have learned the significance and use of scroll bars, novice users must acquire that knowledge and skill, slowing broader adoption of computer systems. Only the function of the end point direction arrows is intuitive, and even many skilled computer users will move through a displayed document using only that functionality.

Scroll bars also give little information about the displayed document. The space within a scroll bar fails to convey the location of document sections, graphics or other landmarks that would orient a user. Instead, document sections must be identified by a "hit or miss" search.

SUMMARY OF THE INVENTION

With the foregoing as background, the present invention contemplates a display generating system, such as a mobile client computer system, in which a scroll bar is selectively deployed from a less active or "stored" position to a fully active or "extended" position. Deployment of the scroll bar may be by an animated process resembling an unrolling. By deploying the scroll bar only as required and requested by a user, the scroll bar may be enlarged for use and additional functions supported.

BRIEF DESCRIPTION OF THE DRAWINGS

Some of the purposes of the invention having been stated, others will appear as the following description proceeds, when taken in connection with the accompanying drawings, in which:

Figure 13:
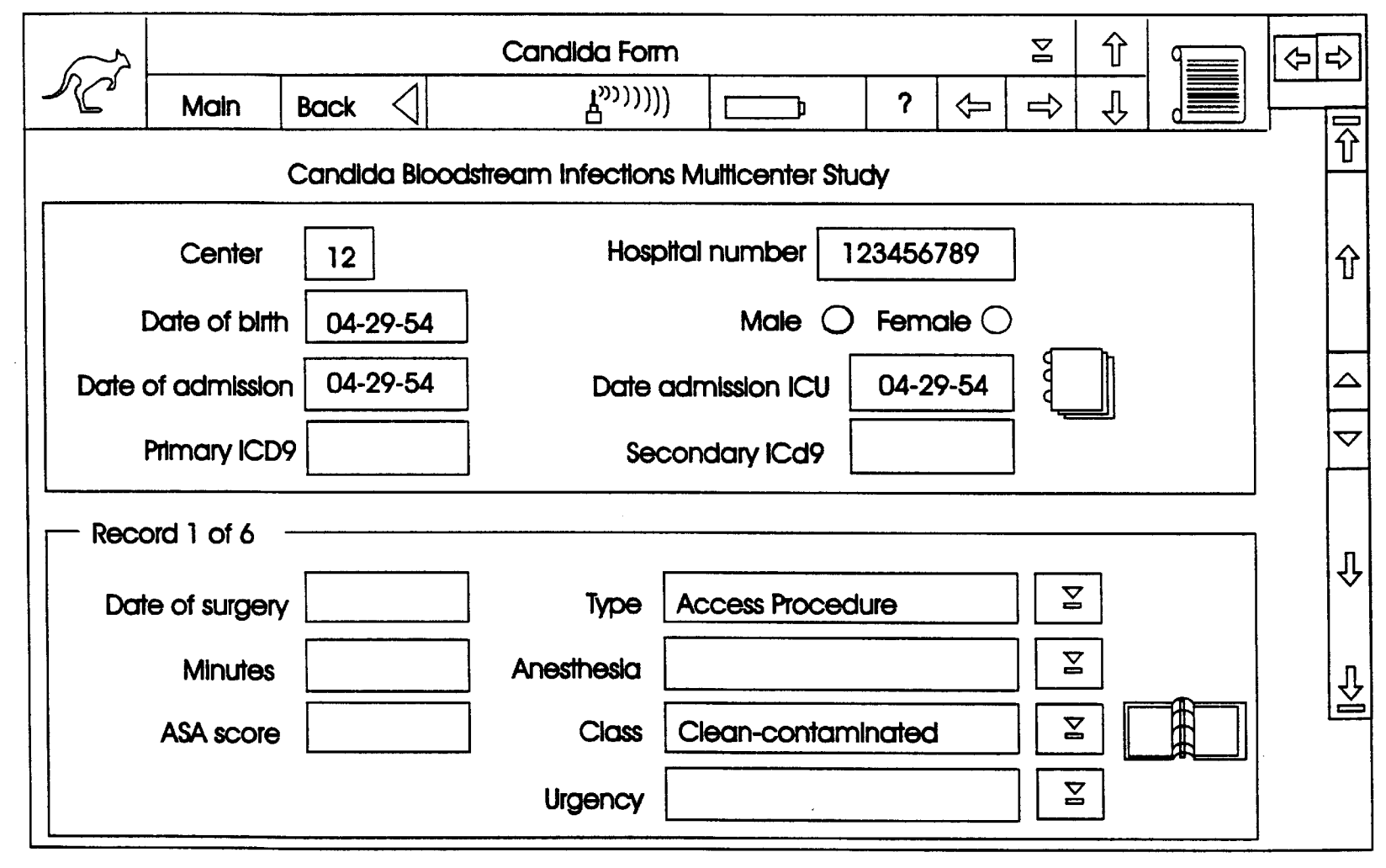

FIGS. 10 through 13 are views similar to FIGS. 8 and 9 showing the scroll bar of this invention deployed into a use position and as implementing various additional functions.

DESCRIPTION OF THE PREFERRED EMBODIMENT(S)

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
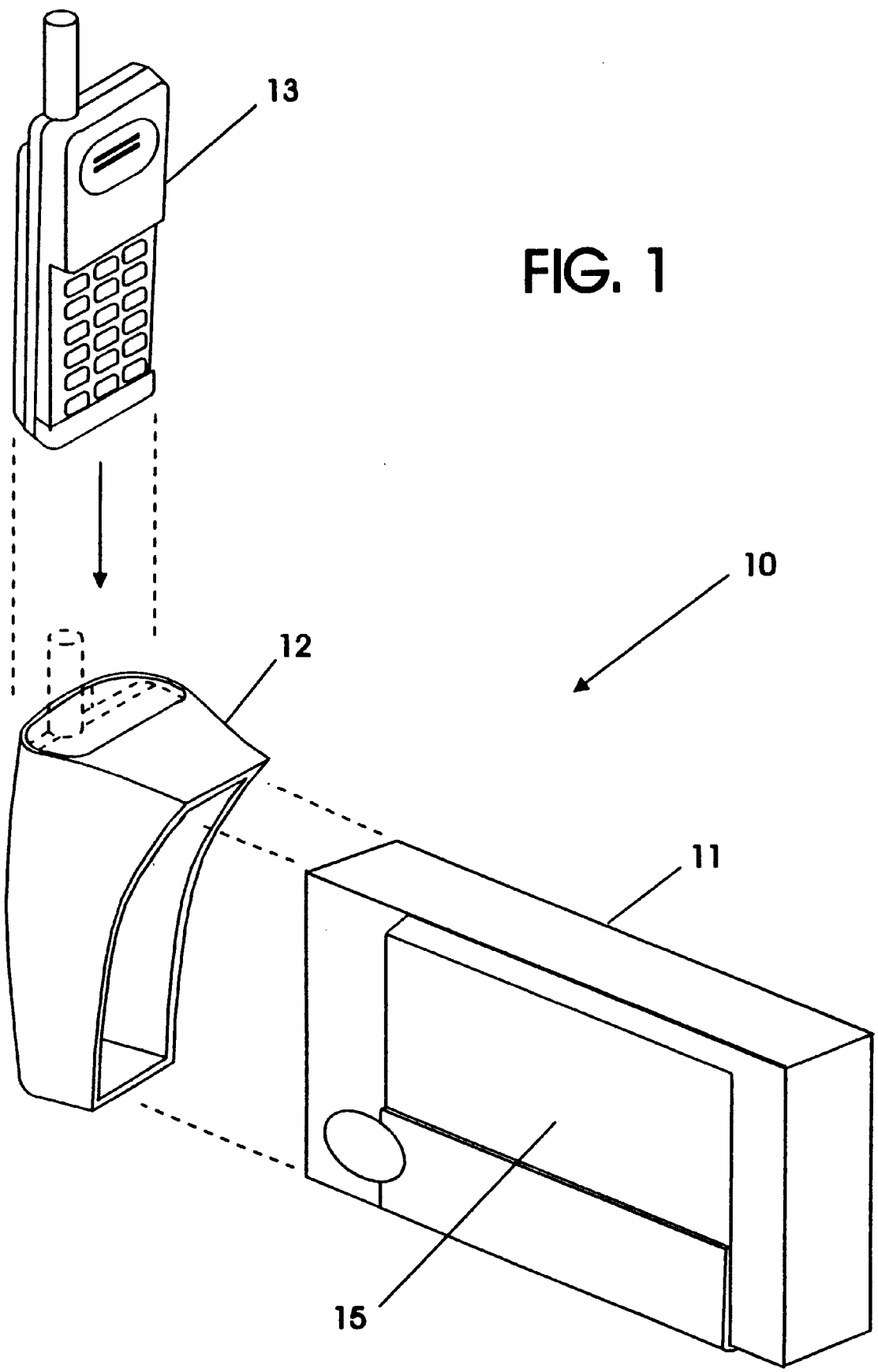
FIG. 1 is an exploded perspective view of certain elements of a mobile client computer system in accordance with this invention.
Figure 2:
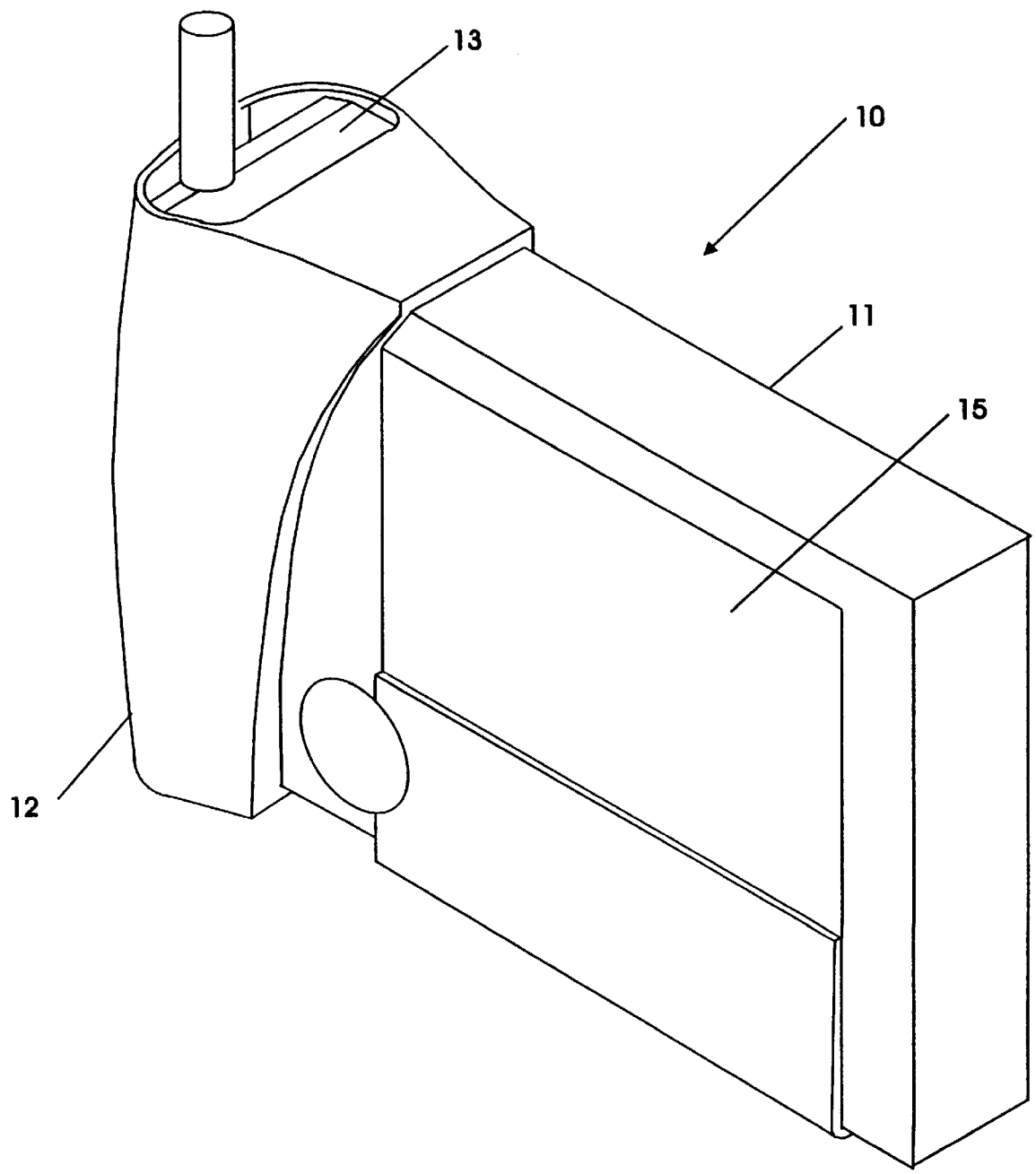
FIG. 2 is a perspective view of the mobile client system of FIG. 1 as assembled for use.

Referring now more particularly to the accompanying Figures, FIGS. 1 and 2 illustrate an exemplary embodiment of a mobile client personal computer system (herein also called a "mobile client") in accordance with this invention and indicated generally at 10. As will become more clear from the description which follows, the mobile client may have a variety of characteristics while remaining within the contemplation of this invention. Central among those characteristics is that the system have provision for the capability of communicating at least data, possibly both data and audio such as voice, between the mobile client system and supporting servers and mainframes. In the illustrated embodiment, such capability is provided by providing a system which is separable into three distinct components, namely a system tablet 11, a holster 12 and a radio transceiver 13. In the form illustrated, the transceiver 13 is a cellular telephone which may be mounted within the holster 12, while the holster 12 may be connected with the system tablet 11 by slipping the tablet into a receptacle provided in the holster 12. While thus illustrated and here described as a three component system, it will be understood that many of the advantages of this invention as described hereinafter can be realized where the mobile client system 10 is unified. That is, where the radio transceiver 13 is integrated with the system tablet 11 and the connection therebetween is accomplished within a single cover for the system, apart from any use of a holster 12. The transceiver/holster/tablet organization provides certain advantages in some circumstances. However, it is to be understood that the invention can be practiced apart from this particular organization.

An advantage realizable with the tripartite organization is the ready substitution of one radio transceiver for another. More particularly, while digital data and analog audio can be exchanged over a cellular telephone radio interface, with data using cellular digital packet data (CDPD) protocols, there are other possibilities. Among them can be digital radio techniques such as frequency division multiple access (FDMA) and time division multiple access (TDMA); spread spectrum technologies such as direct sequence spread spectrum (DS-SS) and resultant code division multiple access (CDMA); frequency hopping spread spectrum (FH-SS); and the combination of one of more of these technologies into what are known as advanced mobile phone systems (AMPS) or advanced radio data information service (ARDIS) or RAM Mobile Data. As these technologies evolve and gain wider acceptance, the tripartite organization will facilitate adapting existing tablets 11 to emerging radio transceivers 13, and thereby protect the investment of users in systems. However, for certain environments such as adverse ambient conditions of temperature, humidity, or exposure to shock as by dropping, a unified system with transceiver and tablet and supporting circuitry in a single cover may be a preferred choice.

Figure 3:
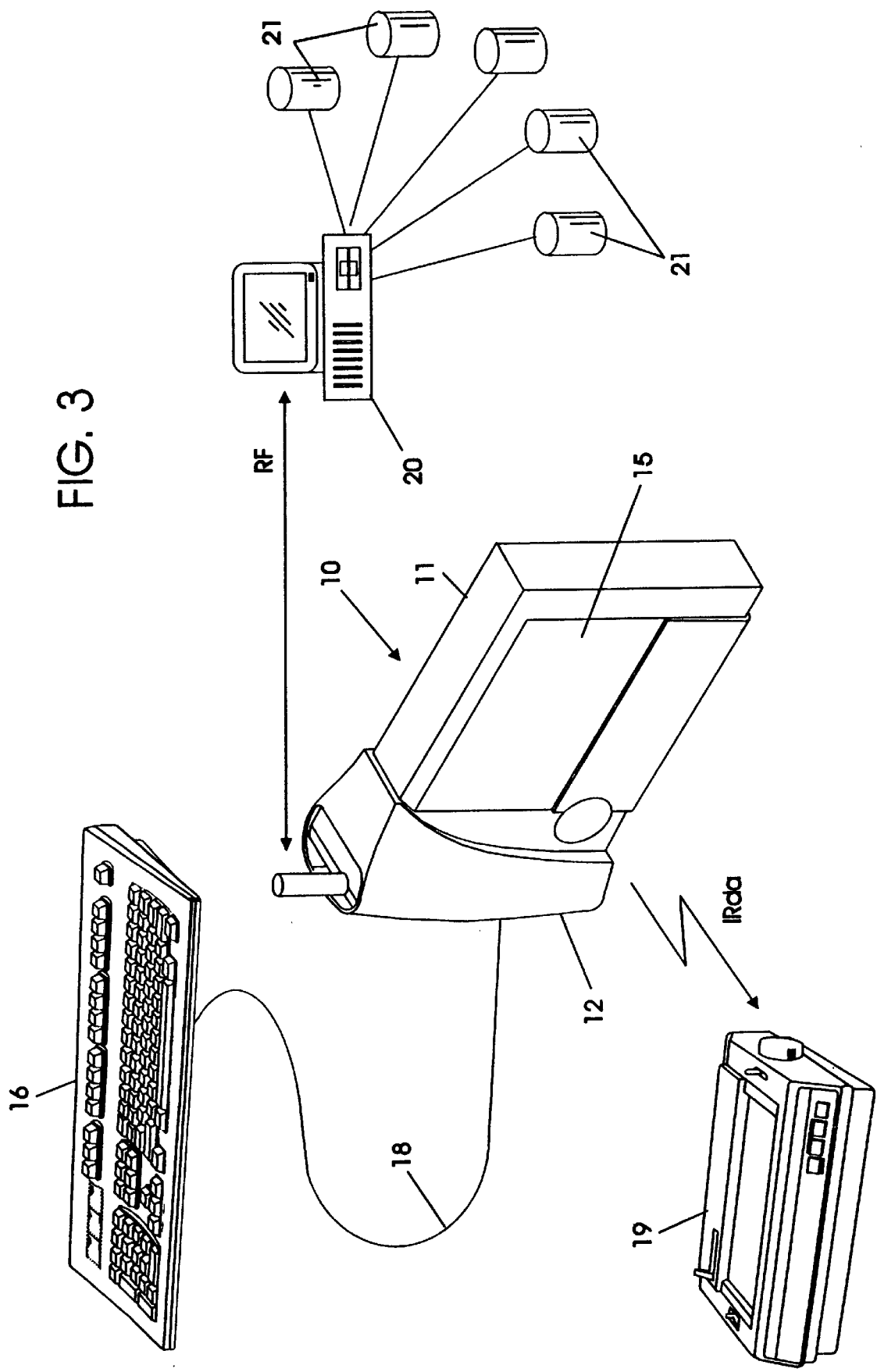
FIG. 3 is a diagrammatic representation of relationships among a mobile client system as shown in FIGS. 1 and 2 and supporting peripherals and systems.

Turning now to FIG. 3, what is there schematically indicated is the relationships among a system 10 in accordance with the invention and supporting servers and peripherals. More particularly, while the tablet 11 (as described more fully hereinafter) is normally adapted for input by a user through a touchscreen 15 embodied in a backlit liquid crystal display, the system 10 can accommodate a more conventional keyboard 16. The keyboard may be, as illustrated, wire tethered to the system 10 when desired for use, with the tethering conductors 18 providing signal pathways for data input to reach the system 10. Alternatively, the keyboard may be linked for data transfer by other means known to persons of skill in the art, such as by an infrared link using a known protocol. In the drawing, the system is shown linked to a printer 19 by an IrDA link for data transfer by infrared radiation.

As indicated above, the radio transceiver provides a radio frequency link to a server indicated at 20, which may communicate by wireline with supporting mainframe data storage 21. Data relevant to the operation of the entire enterprise will be maintained on the supporting mainframe, and made available to the mobile client 10 in accordance with this and the above identified related inventions.

Figure 4:
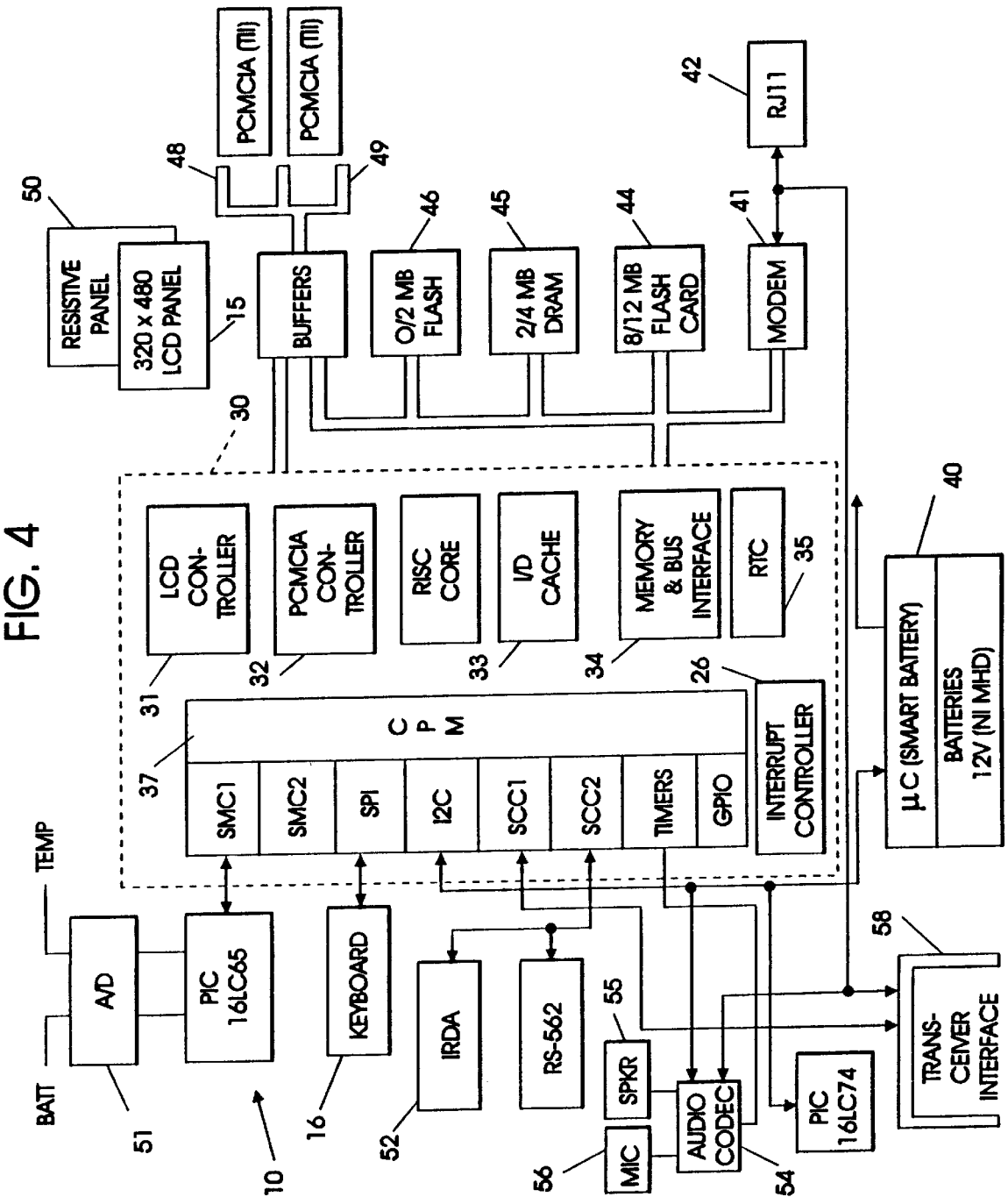
FIG. 4 is a schematic showing of certain circuitry elements embodied in the mobile client of FIG. 2.

Turning now to the circuitry elements which together accomplish the processing of data in accordance with this invention, FIG. 4 illustrates one form of organization of such elements. As there shown, the illustrated mobile client system 10 has at its core a microprocessor (indicated at 30) which uses reduced instruction set computing (RISC) characteristics, The processor has elements which include a controller 31 for a liquid crystal display; a controller 32 for peripherals of the type known as PCCards or PCMCIA cards; instruction/data cache 33; an interface to memory and an external bus 34; and a real time clock 35; The microprocessor also has an interrupt controller 36 and a defined interface for a variety of services 37. While here disclosed as a single processor chip having these characteristics, it is known from the manufacture and use of prior art computer systems that such computational capability and interface availability can be reached by other means, such as the use of an Intel X86 based processor surrounded by appropriate support logic or chips. Thus while the embodiment of FIG. 4 is offered as exemplary of a system in accordance with this invention, it is known the core functionality of such a mobile client system can be otherwise configured.

As indicated in FIG. 4, the core microprocessor 30 is supported by peripherals. Most importantly, power for operating of the system is supplied from a battery 40. Preferably, the battery 40 is of the type known as a "smart" battery, in which provision is made for self monitoring by the battery of charge state and recharge progress. Such batteries are known and will provide signals to the mobile client system processor 30 which can be used to generate indications to a user of the battery charge state, readiness for re-use after charging, etc. The mobile client also preferably has a conventional modem 41, for use when connected by wireline, and a telephone interconnection point 42 (indicated as an RJ-11 connector). Memory for the system is provided by a flash memory accessory card 44.; by dynamic random access memory (DRAM) 45; and by core flash memory 46. Preferably, a pair of PCMCIA slots, of type 11, are provided as shown at 48 and 49 for the addition of other functionality.

In order to display the result of data handling operations performed by the mobile client system, the system 10 has an LCD 15 as mentioned above. The LCD is overlain by a suitable touchscreen 50 which functions as a digitizer to recognize when input is made by a user. There will be further discussion of this functionality later in this description. Input from the touchscreen, as from the battery and a temperature sensor, passes through an analog/digital converter 51 to an input/output (I/O) port of the processor 30. Other I/O ports of the processor 30 provide for connection to a keyboard as described above; an IrDA port 52, an audio CODEC 54 and associated speaker 55 and microphone 56; and an interface connector 58 for the radio transceiver 13.

As was pointed out hereinabove, it is to be understood that the specific organization of functions here described with reference to FIG. 4 may be varied due to a designer's choice of functions to be supported, processor core, and support logic.

As mentioned above, the mobile client system 10 obtains power from a battery. While such operation is appropriate for mobility, provision is made for support of the system 10 by connection to more conventional power sources in the form of alternating current electrical mains. Such power sources are identified at 60 in FIG. 5, to which reference is had in the following description of power management relationships. As will be understood, the management of power usage by a mobile client system is significant with regard to usability of the system.

Figure 5:
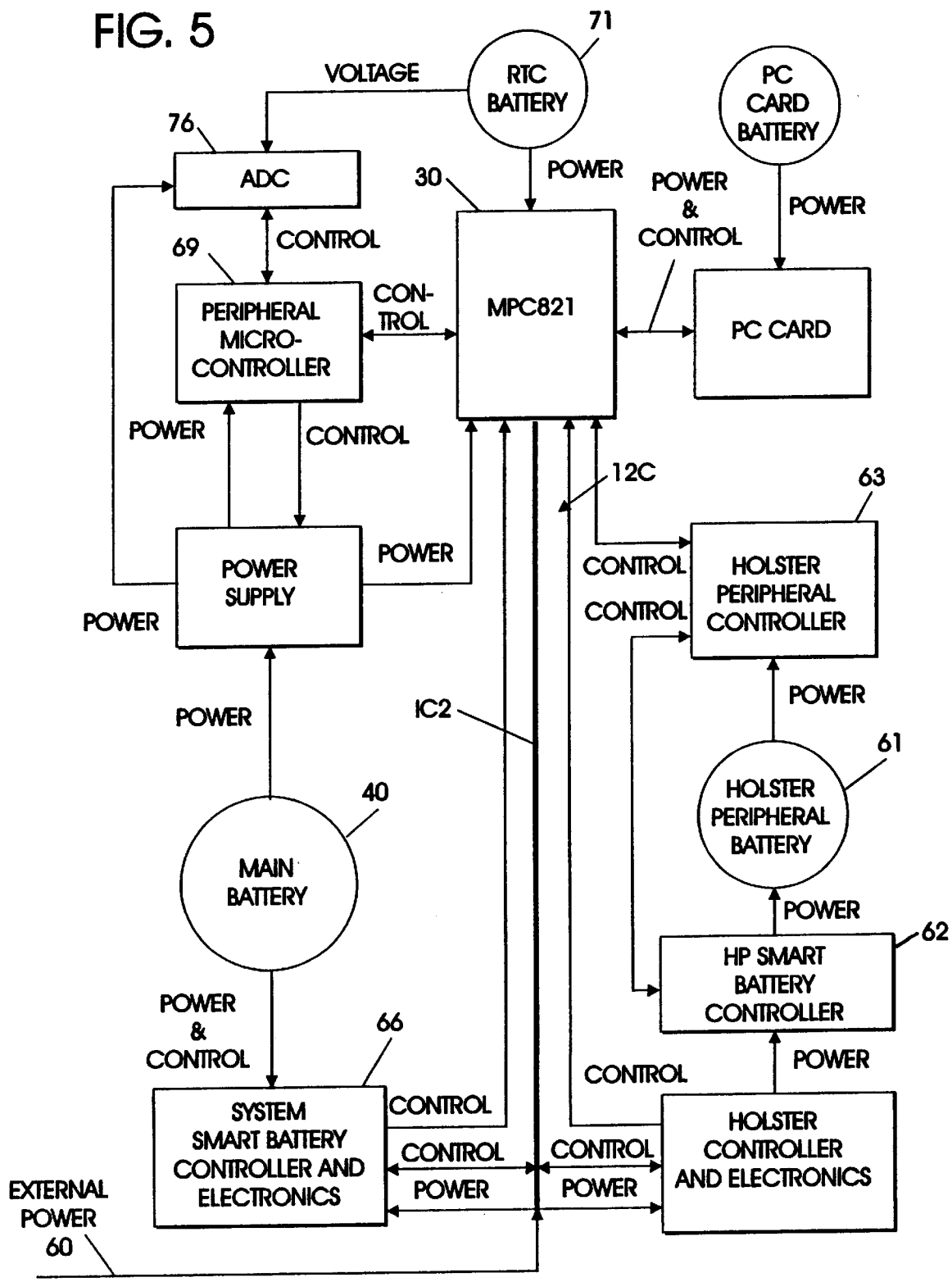
FIG. 5 is a schematic showing of certain circuitry elements and their relationships in the mobile client of FIG. 2.

FIG. 5 illustrates the organization of peripherals around the processor 30 from the perspective of power sources and consumption. The power management topology is such that power flows to the processor 30 in the tablet 11 from the main battery 40, while separate flows of power and control impact the holster 12, any radio transceiver 13 mounted in the holster, and any PCCard accessories used by the system. This division of power flows is of significance to the mobile client system 10 here described. More particularly, a separate battery 61 is provided in the holster 12. The holster battery 61 preferably is a "smart" battery, and has associated therewith in the holster 12 a battery controller 62, a holster peripheral controller 63, and associated circuitry 64 effective to interface the data streams flowing to and from the processor 30 with the radio transceiver 13. Thus, while circuitry in the holster 12 and transceiver 13 is under the control of the processor 30 (as will be pointed out more fully hereinafter), the power source is at least somewhat independent of the tablet 11. This is a significant division. When the tablet is engaged with a holster, the circuitry in the two components cooperates in management of the whole. When a transceiver 13 (which, if a conventional cellular telephone, may have its own power source and power management techniques) is positioned in the holster 12, then the transceiver 13 may also have a coordinated role in participating in power management for the tripartite system.

Turning more particularly to the tablet 11, that system will have controller circuitry 66 for the battery 40 and a power supply 68 to which the battery 40 supplies power for operation of the tablet 11. In the present system, provision is made for a separate microcontroller 69 to exercise control over the power supply in order to off-load certain requirements from the core processor 30. The microcontroller receives input from the processor 30 and from a converter 70. The processor 30 and converter 70 are supported, for minimal functions, by a battery 71 for the real time clock 35. The RTC battery 71 assures that the tablet system will wake up when called as described more fully hereinafter.

Figure 6:
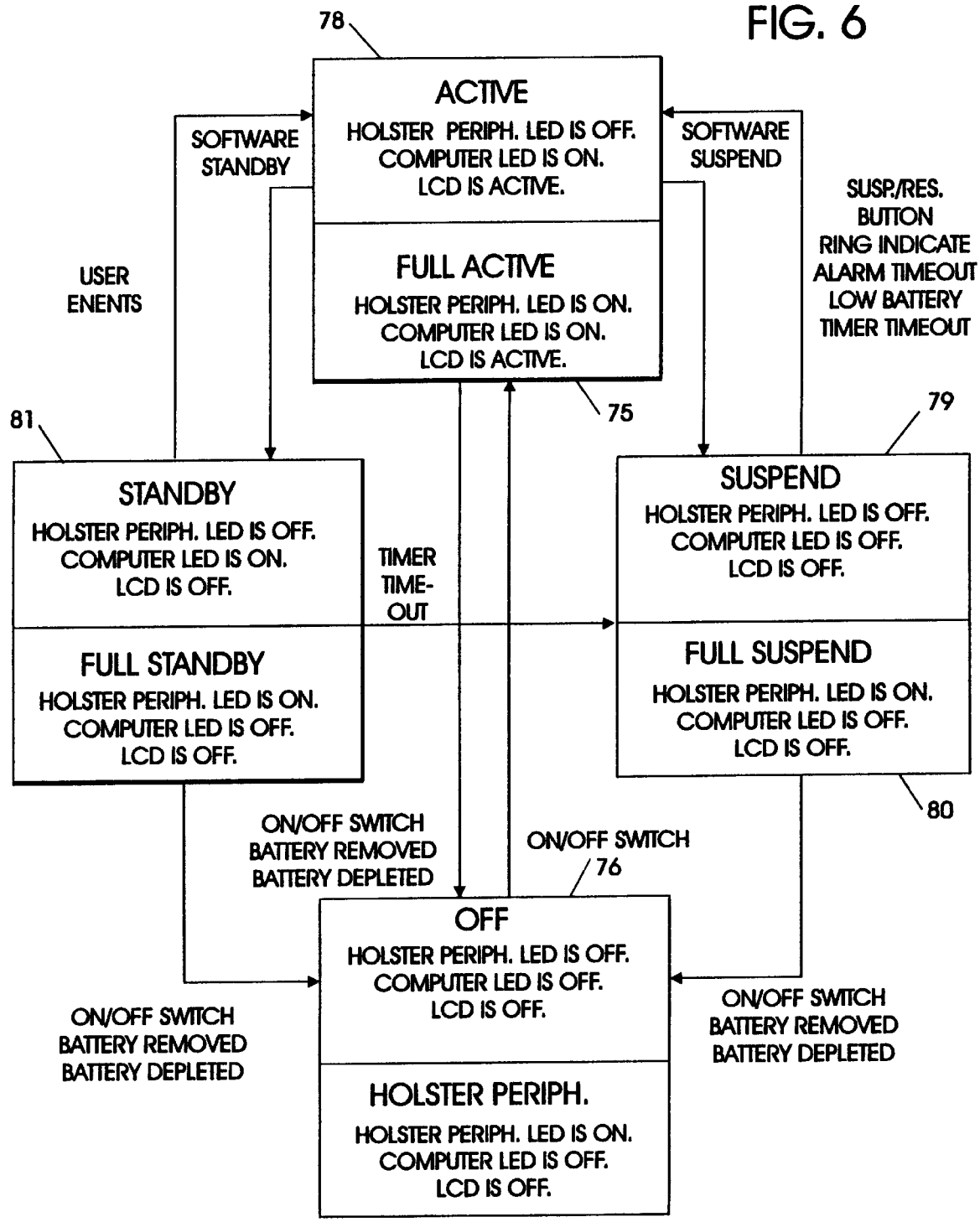
FIG. 6 is a state diagram of power modes for the mobile client of FIG. 2 and transitions among them.

Turning now from the hardware topology to a discussion of the power modes and transition events for the mobile client system 10, FIG. 6 is one illustration of such modalities. For purposes of the following description, it should be noted that a user of the mobile client system will be provided with indicators for the levels of activity of the system. Typically, such indicators or annunciators will be in the form of light emitting diodes (LEDs), as such devices are readily available, inexpensive, and known to most users of technical devices. The tripartite system may be provided with an indicator for the tablet 11, and indicator for the holster 12, and an indicator for the transceiver 13. In FIG. 6, distinctions are drawn between states of activity which reflect differing levels of activity between the tablet 11 and holster 12, and an assumption is made that the system illustrated is a tripartite system with tablet and holster joined.

With this background in mind, the fully active state of the system will have both the tablet 11 and the holster 12 fully activated as indicated by illumination of the corresponding LEDs and the backlit LCD 15. That state is indicated at 75. The completely opposite state, with all components powered down (as if when all batteries have been removed), is indicated at 76, and would result in all LEDs and the backlit LCD being unilluminated. From the state of being fully active, a user may elect to turn off the holster 12, either by operating a switch provided for that purpose or by interrupting a necessary interconnection through separating the holster from the tablet or the radio transceiver from the holster. In such an event, the tablet LED and LCD may remain illuminated (as the tablet remains active) while the holster LED becomes unilluminated (indicated at 78). The mobile client may be capable of data processing using data stored in memory, yet be disconnected (intermittently or temporarily) from the supporting servers 20 and data storage 21. Upon an occurrence determined by software executing on the mobile client system, the system may enter a state known as suspend. In the suspend state, indicated at 79, the tablet LED and LCD and the holster LED are dark. Should it be appropriate for the radio transceiver to be used while the remainder of the tripartite system remains in suspend state, then the system can enter a state indicated at 80 in which the holster LED is illuminated and the transceiver functional. Similarly, upon an occurrence determined once again by software executing on the mobile client system, the system may enter a state known as standby, indicated at 81. In standby, the tablet LCD will be darkened to save power, while the tablet LED will remain illuminated to indicate that the system can be "awakened" readily. The holster may be either powered down (with LED dark) or remain active. A timer function is provided which, after passage of a predetermined time interval with the system 10 in Standby, will transition the system to Suspend mode.

The system can transition between Off state 76 and Active states 78 or 75 by use of an on/off switch. The system can transition from any Suspend or Standby state to Off state 76 by use of the on/off switch or battery removal. The system can transition from Suspend states 79 or 80 to Active states 78 or 75 in response to a suspend/resume input from a user, an incoming call indication from the radio transceiver connected with the holster, time out of a timed interval, or a battery low charge indication from the smart battery controllers. The system can transition from Standby states to Active states 78 or 75 in response to user events such as an input by way of the touchscreen or keyboard.

Figure 7:
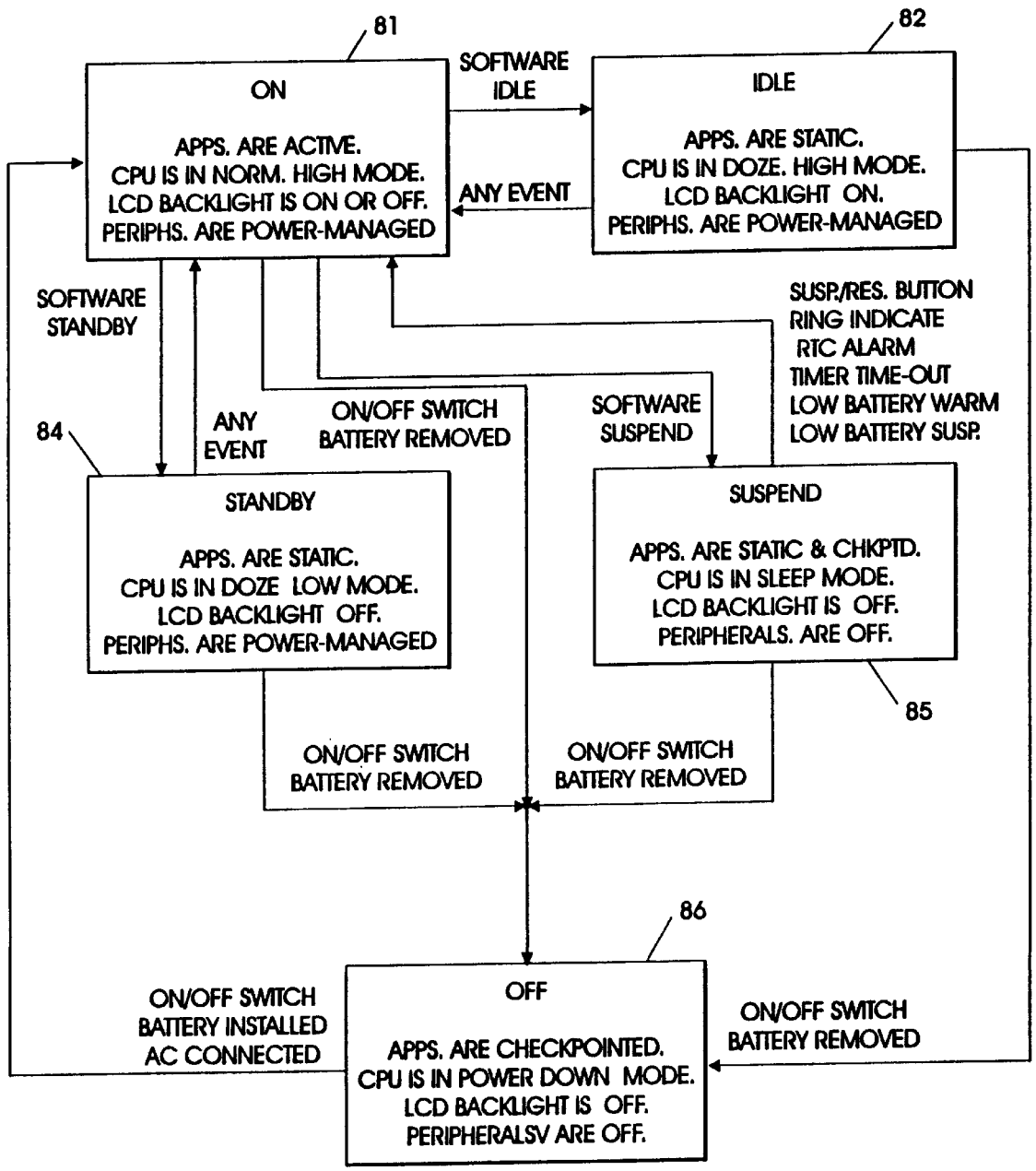
FIG. 7 is a diagram similar to that of FIG. 6 showing the states of certain elements of the mobile client of FIG. 2 and including the status of software executing on the mobile client.

Another view of the power modes and transition events is given in FIG. 7. There, the system states are represented as being an On state 81; Idle state 82; Standby state 84; Suspend state 85; and Off state 86. In the On State 81, the system LEDs and LCD are illuminated, the processor 30 is operating in normal high function mode, application programs are active, and other peripherals are power managed as needed. Passage of time with inactivity will result in the system entering the Idle state 82, in which execution of application programs by the processor has ended, the processor enters a "doze high" mode of power management, the LCD is illuminated, and other peripherals are power managed as needed. Any user event will return the system to the On state. Should the passage of time cause the system to enter the Standby state 84, then application programs become static, the processor enters a "doze low" mode of power management, the LCD is dark, and all other peripherals are power managed as needed. Should the passage of time cause the system to enter the Suspend state 85, application programs become static and are checkpointed for resumption, the processor enters a "sleep" mode of power management, the LCD is darkened, and all other peripherals are off. Thus in terms of time intervals for turnaround to fully active state 81, the system will return most quickly from Idle state 82, less quickly from Standby state 84, less quickly from Suspend state 85, and most slowly from Off state 86.

Figure 8:
FIG. 8 is an illustration of the display screen of the mobile client of FIG. 2 while driven by the execution of an application program on the mobile client to display certain data.

It is now believed instructive to address briefly the display and communication of data as contemplated for the mobile client system of this invention. Referring now more particularly to FIG. 8, there is shown there an exemplary representation of a display screen for an application program executed on the system 10. Preferably, the system 10 executes an application program in the nature of a browser program as used for connection by HyperText Transfer Protocol (HTTP) and for files in HyperText Markup Language (HTML). HTTP and HTML have come into wide use in the environment known as the internet or world wide web. These technologies are here used to facilitate operation of the mobile client system with minimal resources in the client and maximum use of resources available through the supporting server and mainframe data storage.

More particularly, the processor 30 of the client system executes an operating system program and a browser program stored in the system flash memory 46. In executing these programs, the system exchanges data with a supporting server by passing data through the radio link provided by the transceiver 13 and interface 58 or the modem 41 if then wire connected. Data so exchanged may be stored for manipulation by the operating system and browser in the system DRAM memory 45. The browser, in conjunction with the data obtained from the supporting server, will display on the LCD 15 a screen which may, for example, appear as shown in FIG. 8. The screen there shown has a title bar 90 across the upper limit of the displayed field and, within the displayed field, a form having defined fields for data such as identifying numerals or names. In the specific form illustrated, the fields include a field for a center number, a hospital number, dates of birth and admission of the identified patient, and the like. Adjacent the title bar 90 is a representation of an animal, shown at 91 and here illustrated as a kangaroo. This representation is used, in accordance with certain implementations of this invention, to indicate that the system is "jumping" from one data access to another and that a user should await completion of the "jump". There are also provided, immediately below the title bar 90, indications of function "buttons" such as return to the main (or initial) screen, go back one screen, exchange data by wireless link, battery charge state, and navigation about the screen presented. Certain fields, such as the Date of Admission to the ICU and the Class fields, may be annotated by a user, and are so indicated by the positioning adjacent those fields of a "notebook" icon. The notebook may be either closed (as adjacent the Date of Admission field) suggesting that it presently lacks any annotation, or opened (as adjacent the Class field) suggesting that it presently contains an annotation.

Inasmuch as the mobile client system 10 has a touchscreen 50 which overlies the LCD 15, input of data into the system can be accomplished by a stylus, pointer or finger applied to fields of the touchscreen. Thus, referring to FIG. 8, should a user desire to input information identifying the gender of a particular patient, the user could touch (with stylus, pointer or finger) the buttons "male" or "female" to enter that data. Similarly, should a user wish to enter an annotation, the user could touch the field defined by the notebook icon to change the icon between the closed and open states and thereby open a field for entry of appropriate numerical or alphabetic data.

Other and further functions of the applications program and the screen display will become more clear from discussion which follows or appears in the above identified related applications.

Figure 9:
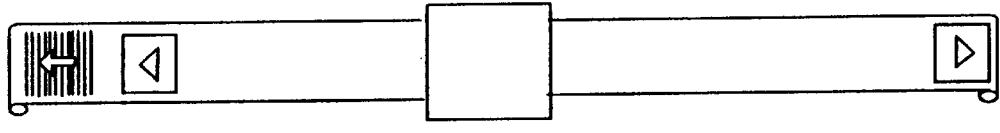
FIG. 9 is a view similar to FIG. 8 showing the scroll bar of the present invention as incorporated into the display of FIG. 8 in a stored or undeployed position.

FIGS. 9 through 13 show an alternative to prior conventional scroll bars which solves the difficulties mentioned hereinabove. The scroll bar of the present invention is illustrated in FIG. 9 in the upper right hand corner of the displayed window and in retracted or stored position. As there shown, the scroll bar may have a displayed indicator (here, a downward pointing arrow) suggestive of the fact that the bar may be deployed or "dropped down" upon being selected by a user. Such selection may be by positioning a displayed cursor over the bar and "clicking", using a conventional pointing device such as a mouse or pointing stick, or, where implemented with a touchscreen input device, by touching the stored scroll bar. The configuration of the retracted scroll is such that the relative position of the displayed window in the entire document is indicated by the apportionment of the upper and lower portions of the "rolled scroll". That is, the greater the displayed diameter of the upper portion of the retracted scroll, the further down in the document is the content displayed in the window.

Figure 10:
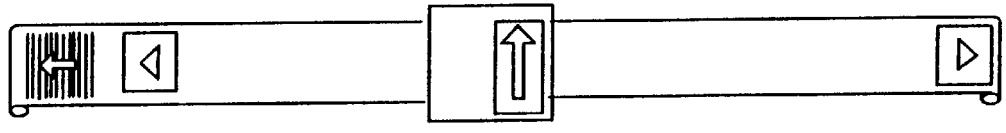

Upon selection of the scroll bar, it is deployed into use position, as illustrated for example in FIG. 10. The scroll extends from the top of the screen down to the bottom. The scroll represents the document. A preferred implementation which portrays this graphically uses a picture of a rolled scroll when the scroll is receded, and use animation to show it unrolling when it extends. As there shown, the deployed scroll bar has indicia providing enhanced functionality over prior conventional scroll bars.

First, an indicia is provided (here, an upward directed arrow) which will guide a user in returning the scroll bar to the stored position from the deployed position.

Next, rather than the prior "elevator" or slider which is positioned within a scroll bar, the present invention provides an enlarged or highlighted area which indicates the position, within a longer document, of a displayed window. This is analogous to a magnifying glass, and serves a similar purpose as will now become more clear. The height of the magnified portion indicates the relative portion of the document currently "on screen". For example, a relatively short document may have such length that the entirety of the document could be displayed in two screens of scrolled area. In such event, the highlighted area would encompass about one half the height of the unrolled scroll.

Figure 12:
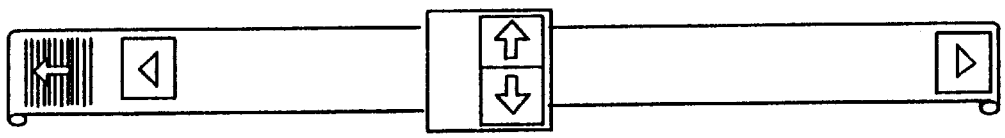
Figure 11:
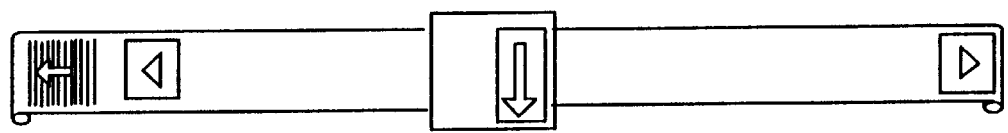

The underlying bar bears end point up and down arrows, in similarity to prior scroll bar displays. However, the enlarged bar also bears indicia indicative of landmarks within the longer document, such as page breaks, graphic elements, major heading text, and the like. Thus a user is given an intuitive representation of the divisions of the document and of the portion of the document enlarged and displayed in the viewing window.

Where the area available for screen display of a portion of a document is restricted, as will be the case in a mobile client system, then additional functionality is implemented in the drop down scroll. Examples are given in FIGS. 11 through 13. In FIG. 11, the "magnified zone" or sliding marker on the deployed scroll bears indicia suggestive of a horizontal scroll capability (here, a rightward pointing arrow). Such indicia will show a user that there is information located to one side (here, the right side) of the displayed window and which can be accessed by touching or selecting the horizontally directed arrow. In FIG. 12, the indicia is suggestive of a possibility of horizontally scrolling to the other side (here, the left). This indicia may be displayed, for example, after a shift to the right margin using the functionality described above with reference to FIG. 11. In FIG. 13, the indicia displayed in the magnified zone or slider is a double headed arrow, showing that additional information is available to either side of the displayed window.

Though users may access additional scrolling functions by selecting the scroll button in accordance with this invention, it is important to note that screen up/down is all of the scrolling functionality that many users need. One feature of this invention is that it avoids dedicated screen space for rarely-used scrolling functions.

The present invention contemplates two ways to use the extended scroll. First, if the user touches any point in the scroll, the window immediately jumps to that point. Second, as the user drags the scroll highlight up and down, the document window changes dynamically. If the system cannot refresh the screen quickly enough, the document window may only change when the user quits dragging. To recede the scroll and return to the state of FIG. 9, the user may touch the document window or the "rollup" arrow. Alternatively, the scroll might recede automatically after each operation.

Since the scroll is not permanently extended like a scroll bar, it can temporarily overlay the document window and hence it can be wider than prior conventional scroll bars. Not only does this present a larger target to the user, but it makes room for more information inside the scroll. The scrolls in FIGS. 10 through 13 show the location in the document of various "landmarks." Headings, horizontal rules, pictures, and other document elements may be represented in the scroll by appropriate symbols. If the user touches the scroll near one of the landmarks, the document window snaps to the landmark position. The appearance of the extended scroll is similar to the "print preview" feature on many computer applications.

While described here with regard to the specific example of vertical scrolling, the invention may be applied to horizontal scrolling as well as vertical. Further, while here described as replacing a prior conventional scroll bar, this invention might augment the scroll bar in an application running under an established GUI instead of replacing it. The drop down scroll of this invention could coexist with a more conventional scroll bar so that users could choose either. On wide screens, the scroll might stay extended all the time. In this case, the document window would be narrower so that the extended scroll would be beside it instead of over it.

In the drawings and specifications there has been set forth a preferred embodiment of the invention and, although specific terms are used, the description thus given uses terminology in a generic and descriptive sense only and not for purposes of limitation.

What is claimed is:

1. A computer, comprising:
   a housing;
   a processor mounted within the housing and processing digital data;
   memory mounted within the housing for storing digital data and coupled to the processor;
   a display coupled to the processor and the memory to display information derived from digital data processed by the processor; and
   a control program stored in the memory and accessible by the processor to direct the processing of digital data by the processor;
   the control program and the processor cooperating, when the control program is executing on the processor, for displaying a configured and a sized scroll bar used in document navigation and selectively shifting the configured and sized scroll bar between a stored display location to display the given configuration of the scroll bar at a first size and a deployed display location to display the given configuration of the scroll bar at a size different than the first size.

2. The computer according to claim 1, wherein the scroll bar when stored occupies a minor area located near a corner of a window of the display.

3. The computer according to claim 2, wherein the scroll bar when stored is located near the upper right hand corner of the window of the display.

4. The computer according to claim 1, wherein the scroll bar when deployed occupies an elongated area adjacent an edge of a window of the display.

5. The computer according to claim 4, wherein the scroll bar when deployed occupies an elongated area adjacent a right hand edge of the window of the display.

6. The computer according to claim 1, wherein the scroll bar unrolls with animation maintaining the given configuration and increasing in size when shifting from the stored display location to the deployed display location.

7. The computer according to claim 1, wherein the scroll bar rolls with animation maintaining the given configuration and decreasing in size when shifting from the deployed display location to the stored display location.

8. The computer according to claim 1, wherein the scroll bar when deployed displays indicia identifying a function of scrolling in a direction perpendicular to the scroll bar.

9. The computer according to claim 1, wherein the scroll bar when deployed displays indicia identifying a function of scrolling in either one of two directions, each perpendicular to the scroll bar.

10. The computer according to claim 1, wherein the scroll bar when deployed displays indicia identifying landmarks within a document, a portion of which document is currently displayed in a window of the display.

11. The computer according to claim 10, wherein the scroll bar when deployed displays an enlarged slider indicative of the location within the document in the window of the display.

12. The computer according to claim 1, wherein the scroll bar when deployed displays an enlarged slider indicative of a location within a document in a window of the display.

13. A mobile client computer, comprising:
   a housing sized to be held in and manipulated by the hand of a user;
   a processor mounted within the housing and processing digital data;

memory mounted within the housing for storing digital data and coupled to the processor;

a display mounted in the housing and coupled to the processor and the memory to display information derived from digital data processed by the processor;

an input digitizer mounted in the housing and overlaying the display, the digitizer being coupled to the processor and enabling input of digital data by a user; and a control program stored in the memory and accessible by the processor to direct the processing of digital data by the processor;

the control program and the processor cooperating, when the control program is executing on the processor, for displaying a configured and a sized scroll bar used in document navigation and selectively shifting the configured and the sized scroll bar between a stored display location to display a given configuration of the scroll bar at a first size and a deployed display location to display the given configuration of the scroll bar at a size different than the first size.

14. The mobile client computer according to claim 3, wherein the scroll bar when stored occupies a minor area located near a corner of a displayed window.

15. The mobile client computer according to claim 14, wherein the scroll bar when stored is located near the upper right hand corner of the displayed window.

16. The mobile client computer according to claim 13, wherein the scroll bar when deployed occupies an elongated area adjacent an edge of a window of the display.

17. The mobile client computer according to claim 16, wherein the scroll bar when deployed occupies an elongated area adjacent a right hand edge of a window of the display.

18. The mobile client computer according to claim 13, wherein the scroll bar unrolls with animation maintaining the given configuration and increasing in size when shifting from the stored display location to the deployed display location.

19. The mobile client computer according to claim 13, wherein the scroll bar rolls with animation maintaining the given configuration and decreasing in size when shifting from the deployed display location to the stored display location.

20. The mobile client computer according to claim 13, wherein the scroll bar when deployed displays indicia identifying a function of scrolling in a direction perpendicular to the scroll bar.

21. The mobile client computer according to claim 13, wherein the scroll bar when deployed displays indicia identifying a function of scrolling in either one of two directions, each perpendicular to the scroll bar.

22. The mobile client computer according to claim 13, wherein the scroll bar when deployed displays indicia identifying landmarks within a document, a portion of which document is currently displayed in a window of the display.

23. The mobile client computer according to claim 22, wherein the scroll bar when deployed displays an enlarged slider indicative of the location within the document in the window of the display.

24. The mobile client computer according to claim 13, wherein the scroll bar when deployed displays an enlarged slider indicative of a location within a document in a window of the display.

25. A display generating system, comprising:

a housing;

a processor mounted within the housing processing digital data;

memory mounted within the housing for storing digital data and coupled to the processor;

the processor and the memory cooperating in supplying digital data driving a display of visual images; and a control program stored in the memory and accessible by the processor to direct the processing of digital data by the processor;

the control program and the processor cooperating, when the control program is executing on the processor, for displaying a configured and a sized scroll bar used in document navigation and selectively shifting the configured and the sized scroll bar between a stored display location to display a given configuration of the scroll bar at a first size and a deployed display location to display the given configuration of the scroll bar at a size different than the first size.

26. The system according to claim 25, wherein the scroll bar when stored occupies a minor area located near a corner of a displayed window.

27. The system according to claim 26, wherein the scroll bar when stored is located near the upper right hand corner of the displayed window.

28. The system computer according to claim 25, wherein the scroll bar when deployed occupies an elongate area adjacent an edge of a displayed window.

29. The system according to claim 28, wherein the scroll bar when deployed occupies an elongate area adjacent a right hand edge of the displayed window.

30. The system according to claim 25, wherein the scroll bar unrolls with animation maintaining the given configuration and increasing in size when shifting from the stored display location to the deployed display location.

31. The system according to claim 25, wherein the scroll bar rolls with animation maintaining the given configuration and decreasing in size when shifting from the deployed display location to the stored display location.

32. The system according to claim 25, wherein the scroll bar when deployed displays indicia identifying a function of scrolling in a direction perpendicular to the scroll bar.

33. The system according to claim 25, wherein the scroll bar when deployed displays indicia identifying a function of scrolling in either one of two directions, each perpendicular to the scroll bar.

34. The system according to claim 25, wherein the scroll bar when deployed displays indicia identifying landmarks within a document, a portion of which document is currently displayed in a window of the display.

35. The system according to claim 34, wherein the scroll bar when deployed displays an enlarged slider indicative of the location within the document in the window of the display.

36. The system according to claim 25, wherein the scroll bar when deployed displays an enlarged slider indicative of a location within a document in a window of the display.

37. A computer, comprising:

a housing;

a processor mounted within the housing and processing digital data;

memory mounted within the housing for storing digital data and coupled to the processor;

a display coupled to the processor and the memory to display in a display window information within a document derived from digital data processed by the processor; and a control program stored in the memory and accessible by the processor to direct the processing of the digital data by the processor;

the control program and the processor cooperating to display a scroll bar used in document navigation at a stored scroll bar display location having a configuration providing a graphical indicator indicative of the location of the information displayed in the display window within the document and selectively shifting the configured scroll bar between the stored scroll bar display location to a deployed scroll bar display location to display the scroll bar in an extension of the configuration displaying within the extended scroll bar the location of the information in the document.

38. The computer, as defined in claim 37, wherein the graphical indicator indicative of the location of the information within the document is a scroll roll wherein the relative diameter of the scroll roll is an approximate measure of the location of the information displayed in the window within the document.

39. The computer, as defined in claim 37, wherein the graphical indicator indicative of the location of the information within the document is a scroll roll wherein the relative diameter of the scroll roll is an indication of how far the information displayed in the window is from the beginning of the information and the end of the information within the document.

40. The computer according to claim 37, wherein the scroll bar when stored occupies a minor area located near a corner of a displayed window.

41. The computer according to claim 40, wherein the scroll bar when stored is located near the upper right hand corner of the displayed window.

42. The computer according to claim 37, wherein the scroll bar when deployed occupies an elongate area adjacent an edge of a displayed window.

43. The computer according to claim 42, wherein the scroll bar when deployed occupies an elongate area adjacent a right hand edge of a displayed window.

44. The computer according to claim 38, wherein the scroll roll of the scroll bar unrolls with animation when shifting from stored display to deployed display.

45. The computer according to claim 38, wherein the scroll roll of the scroll bar rolls up with animation when shifting from deployed display to stored display.

46. The computer according to claim 37, wherein the scroll bar when deployed displays indicia identifying a function of scrolling in a direction perpendicular to the scroll bar.

47. The computer according to claim 37, wherein the scroll bar when deployed displays indicia identifying a function of scrolling in either one of two directions, each perpendicular to the scroll bar.

48. The computer according to claim 37, wherein the scroll bar when deployed displays indicia identifying landmarks within a document, a portion of which is currently displayed.

49. The computer according to claim 48, wherein the scroll bar when deployed displays an enlarged slider indicative of the location within a document of the displayed window.

50. The computer according to claim 37, wherein the scroll bar when deployed displays an enlarged slider indicative of the location within a document of the displayed window.

51. The computer according to claim 37, further including a second scroll bar feature, comprising, a vertically extending bar disposed remotely within the window of the display from the digital data displayed in the window wherein the bar includes a slider movable up and down the bar to change the digital data displayed in the window of the display.

52. The computer according to claim 51, wherein the second scroll bar includes six buttons which buttons function to provide for viewing of the displayed digital data at the top of document, at the next page up, at the next line up, at the next line down, at the next page down, and at the bottom of the document.

* * * * *